(12) United States Patent
Bordner

(10) Patent No.: US 6,283,889 B1
(45) Date of Patent: Sep. 4, 2001

(54) LIMITED SLIP DIFFERENTIAL CLUTCH PACK

(75) Inventor: Bruce Neal Bordner, Angola, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/480,886

(22) Filed: Jan. 11, 2000

(51) Int. Cl.$^7$ .................................................. F16H 48/06
(52) U.S. Cl. ............................................................ 475/231
(58) Field of Search ............................................. 475/231

(56) References Cited

U.S. PATENT DOCUMENTS

| | | |
|---|---|---|
| 3,308,685 | 3/1967 | Wojcikowski . |
| 3,326,064 | 6/1967 | Ordorica, Jr. . |
| 4,040,271 | 8/1977 | Rolt et al. . |
| 4,245,525 | 1/1981 | LeBegue . |
| 4,876,921 | 10/1989 | Yasui et al. . |
| 5,045,038 | 9/1991 | Sherlock . |
| 5,741,199 | 4/1998 | Tanser et al. . |

*Primary Examiner*—Dirk Wright
(74) *Attorney, Agent, or Firm*—Liniak, Berenato, Longacre & White

(57) ABSTRACT

A limited slip differential assembly comprising a differential case and two side gears rotatably supported within the differential case. Each of the side gears provided with a pre-loaded clutch pack mounted on a hub portion of the side gear. A lock ring is permanently pressed on the hub portion of the side gear adjacent the clutch pack for retaining the clutch pack in a predetermined pre-loaded condition, thus forming a side gear/clutch pack assembly which may be pre-assembled as a pre-loaded self-contained module before the various components of the differential assembly are assembled in the differential case.

9 Claims, 3 Drawing Sheets

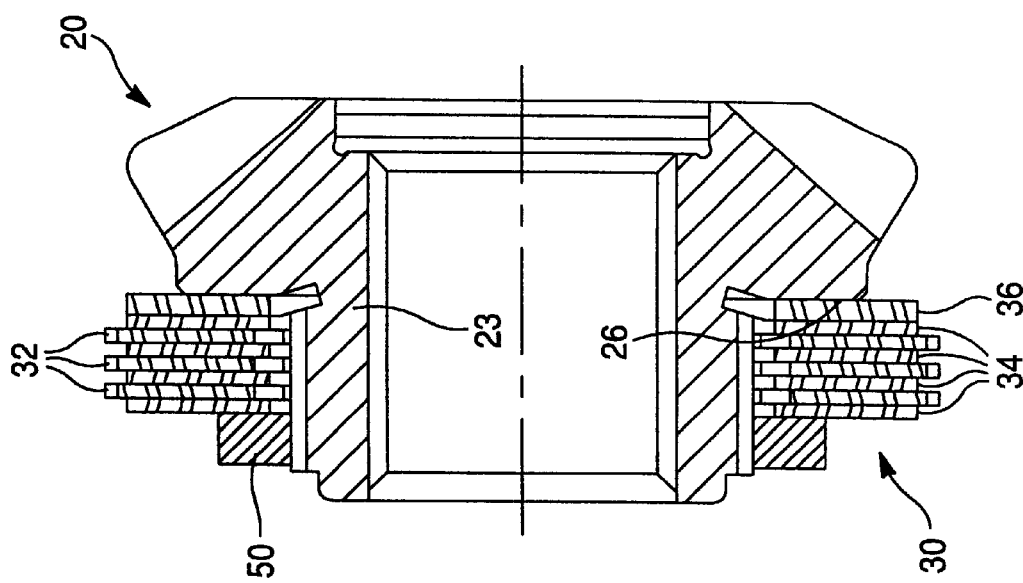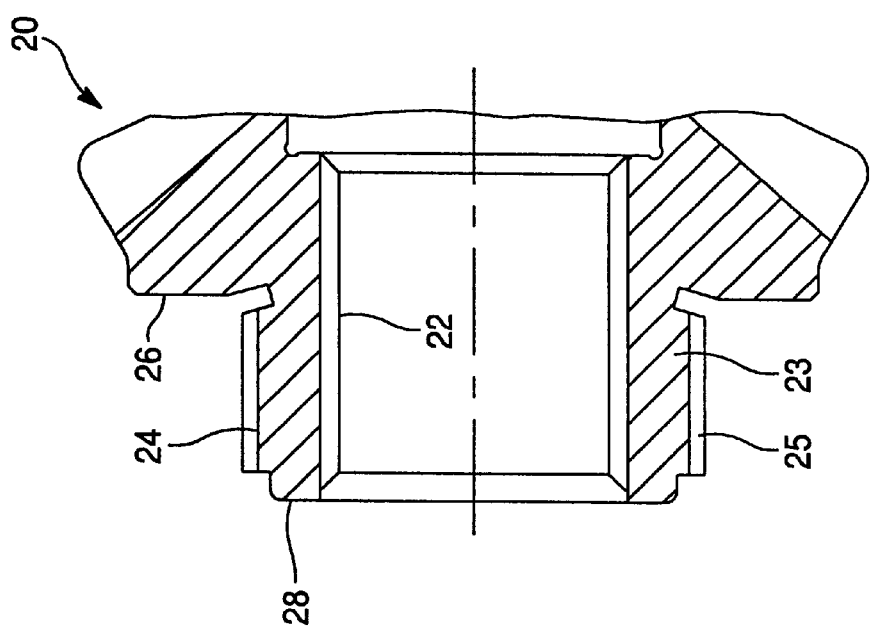

LIMITED SLIP DIFFERENTIAL CLUTCH PACK

BACKGROUND OF THE INVENTION

1. Field of the Invention

The present invention relates to a differential assembly, and more particularly to a pre-loaded clutch pack for a limited slip differential (LSD).

2. Description of the Prior Art

Limited slip differentials are well known in the prior art. Typically, clutch assemblies provide required slip limiting properties in the limited slip differentials. A conventional limited slip differential usually comprises a case rotatable about an axis, housing two bevel side gears coaxial with the case. Each of the side gears is intermeshing with bevel planet gears which are supported in the case on an axis perpendicular the axis of the side gears. Between the differential case and the side gears are interposed the respective clutch assemblies, usually in the form of clutch packs comprising alternately stacked clutch plates and discs, and Belleville springs, to provide the limited slip action. The two clutch packs pilot on side gear hub. The plates are keyed to the case, whereas the discs are splined to the side gear hub. Since these plates are alternately stacked, any rotation of the differential gears causes the frictional surfaces of the plates to turn against each other. The LSD clutch packs are provided with a certain initial pre-load. The pre-load is accomplished by using a biasing means (such as Belleville springs) and plates of various thickness, which cause the Belleville springs to compress when the differential is assemble. The pre-load increases the turning resistance between the clutch plates. The LSD clutch pre-load is currently measured in terms of a torque-to-rotation measurement for the differential case assembly. This is a combination of the Belleville spring force and the frictional characteristics of the plates and discs.

The existing designs of the limited slip differentials do not provide proper control of the clutch pack pre-load, because pre-load can not be controlled individually. Only the torque-to-rotation of the fully assembled differential assembly can be measured. This could allow the differential assembly to be built with differently pre-loaded clutch packs (one tighter than the other), and still have the total torqueto-rotate value within specifications. This results in a larger amount of torque available at one wheel than at the other.

Typically, current differential designs require the selecting from four selective thickness plates to obtain the necessary overall clutch pack thickness to compress the Belleville springs. Then the differential gear is assembled. If the desired torque-to-rotate is not achieved, the differential is disassembled and new plates selected. That makes correct pre-loading of the clutch pack of LSD a very laborious process.

Moreover, any wear which occurs in the differential components, such as spherical radii and side gear thrust faces, spherical washers, pinion mates, cross pin, side gears, discs or plates, etc., results in loss of pre-load.

The existing limited slip differential assemblies are usually provided with a spring means (such as Belleville springs) to urge the side gears away from one another to induce frictional engagement of the clutch assemblies. However, under high torque conditions, side gear separating forces overcome the spring force. This extra force can hamper differentiating, and is detrimental in a truck or light utility vehicle application where heavy loads or trailer tow is involved, even though it may be beneficial in a high performance application.

Therefore, the conventional design renders the existing limited slip differential assemblies quite complex in manufacturing, cumbersome and expensive.

SUMMARY OF THE INVENTION

The present invention alleviates the drawbacks of the prior art by providing a self contained clutch pack and side gear assembly for limited slip differential.

The limited slip differential in accordance with the present invention includes two clutch packs that pilot on hub portions of side gears. Each of the clutch packs includes a plurality of friction plates and discs pre-loaded with a Belleville spring. The present invention provides an accurate pre-load by compressing the clutch pack (the plates, the discs and the Belleville spring) on the side gear, then press-fitting a lock ring on the hub of the side gear.

Thus, the present invention allows accurate control of a clutch pack pre-load by controlling the compression of each clutch pack individually. Consequently, the need for selective thickness plates is eliminated, and the additional torque caused by gear separating force can be eliminated. Also, the present invention eliminates the pre-load drop-off due to wear of the differential case, pinion mates, side gear teeth, spherical washers, cross pin, etc. Moreover, because this clutch pack pre-load is set prior to its assembly into a differential case, the assembling process is simplified.

Thus, the present invention improves the performance of the limited slip differential assemblies and reduces production cost thereof.

BRIEF DESCRIPTION OF THE DRAWINGS

Other objects and advantages of the invention will become apparent from a study of the following specification when viewed in light of the accompanying drawings, wherein:

FIG. 2 is a cross-sectional view of a side gear;

FIG. 3 is a perspective view of a self-contained side gear/clutch pack assembly in accordance with the present invention;

DETAILED DESCRIPTION

Figure 1:
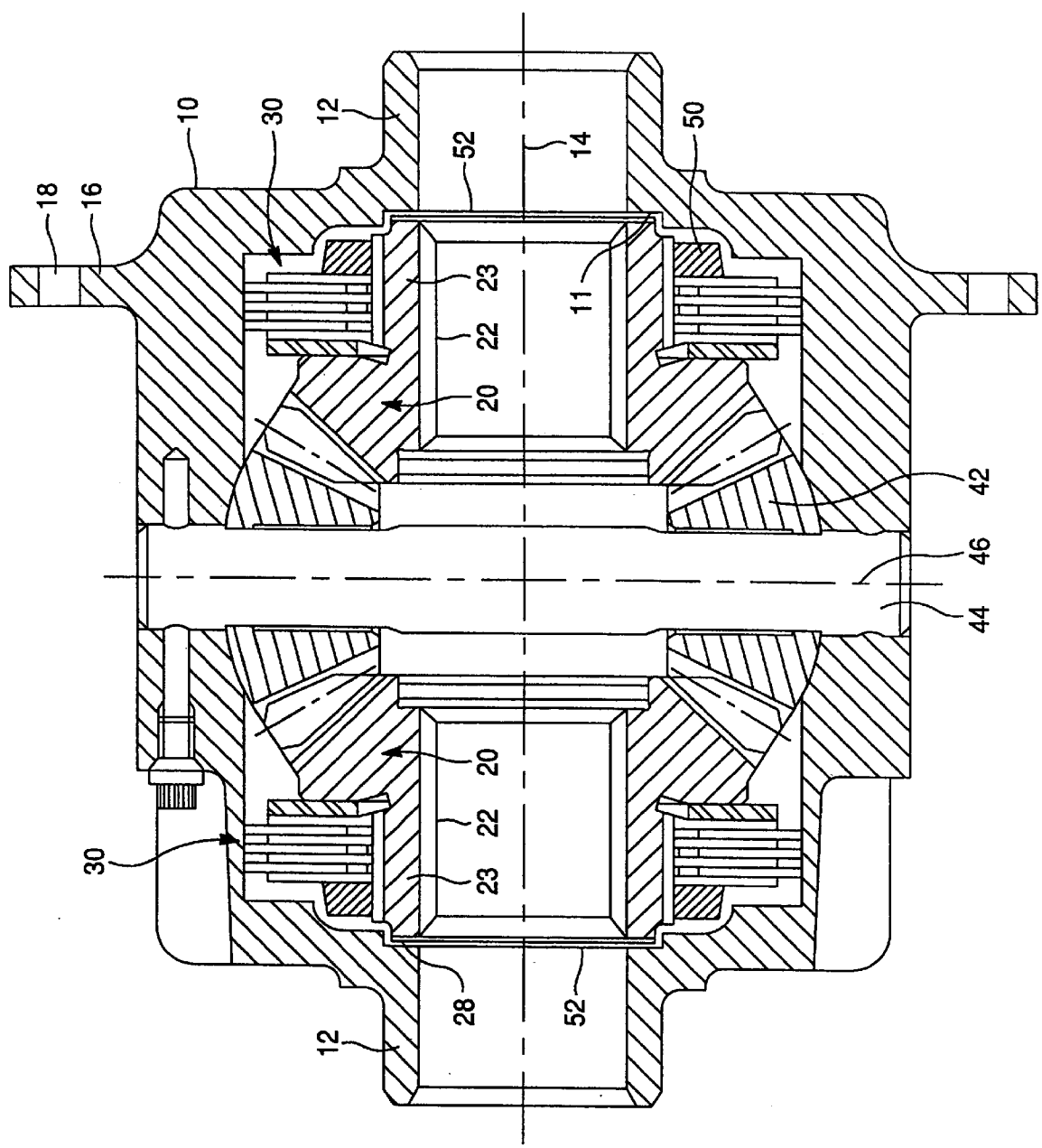
FIG. 1 is a cross-sectional view of a limited slip differential in accordance with the first preferred embodiment of the present invention.

FIG. 1 of the drawings illustrates a novel arrangement a limited slip differential in accordance with the present invention comprising a differential case 10 having opposing axial spigots 12 at each end thereof. The spigots are provided to mount the case 10 for rotation about an axis 14 on rolling bearings (not shown) supported by a differential carrier (not shown). The differential case 10 has an external flange 16 with circumferentially spaced holes 18 for attachment by bolts to a ring gear (not shown). The ring gear meshes with an input pinion connected to a driveline of a motor vehicle (not shown).

The differential case forms a hollow compartment in its interior, within which a pair of bevel side gears 20 are disposed. The side gears 20 are supported for rotation about the axis 14 relative to the case 10. The side gears 20 have respective splined bores 22 for a torque transmitting connection to axle shafts (not shown) extending into the case 10 through the spigots 12. Each side gear 20, illustrated in detail in FIG. 2, includes a hub portion 23 defining a generally cylindrical outer peripheral hub surface 24 and a side gear thrust face 28 corresponding to an annular radially extending thrust face 11 formed in the hollow compartment inside the differential case 10, shown in FIG. 1. A thrust washer 52 is provided between the differential case thrust face 11 and the side gear thrust face 28. The hub portion 23 is provided with a plurality of splines 25 formed on the nub surface 24. Radially outwardly extending from the hub surface 24 is an engaging face 26.

As illustrated in FIG. 3, each side gear 20 is provided with a clutch pack 30 that is disposed adjacent to the engaging face 26. The clutch pack includes a plurality of interleaved annular clutch plates 32 (defined hereinafter as first members) and discs 34 (defined hereinafter as second members). The first members 32 are rotationally fast with the case 10 in a manner well known in the prior art, while the second members 34 are splined to the side gear hub portion 23 via splines 25, so that the first and second members are disposed in an alternative order. Biasing means is provided in the clutch pack 30 for resiliently pressing the first and second members 32 and 34 respectively, into frictional engagement with each other, thereby providing a pre-load on the clutch pack 30. More particularly, each clutch pack 30 includes at least one annular resilient member 36 which is axially deformed and adapted to be axially compressed to impose its resilient effect upon the members 32 and 34. Preferably, the resilient member 36 is in the form of a spring washer commonly referred to as a Belleville spring, and is disposed about the hub 23 of the side gear 20 and is positioned intermediate the axially innermost member 34 and the engaging face 26 of the side gear 20.

In contrast with the limited slip differentials of the prior art, the pre-loading of the clutch pack 30 in accordance with the present invention is attained independently of the differential case 10. In order to pre-load the clutch pack 30, the clutch pack 30 is mounted on the hub 23 of the side gear 20 and compressed, then a lock ring 50 is permanently fixed (preferably by interference fitting) about the hub 23 in the position adjacent to the clutch pack 30 to retain the clutch pack 30 in the predetermined pre-loaded condition, as illustrated in FIGS. 1 and 3. Thus, the combination of the side gear 20, the clutch pack 30 and the lock ring 50 defines a side gear/clutch pack assembly (illustrated in FIG. 3) which may be pre-Assembled as a pre-loaded self-contained module before the various components of the differential assembly are assembled in the differential case. Moreover, by providing the thrust washer 52 between the differential case thrust face 11 and the side gear thrust face 28, the clutch pack 30 becomes isolated from the axial thrust force of the differential side gears 20.

Bevel planet gears 42 are provided in meshing engagement with the side gears 20. The planet gears 42 are supported on a shaft member 44 which extends transversely across the case 10 perpendicular to the axis 14. The planet gears are rotatable about an axis 46 of the shaft member 44. The shaft member 44 is retained in the case 10 in any appropriate manner known in the prior art.

Therefore, the limited slip differential in accordance with the first preferred embodiment of the present invention provides not only the accurately pre-loaded self-contained side gear/clutch pack assembly, but also eliminates the additional torque caused by gear separating forces that is especially beneficial in a truck or light utility vehicle application where heavy loads or trailer tow is involved.

Figure 4:
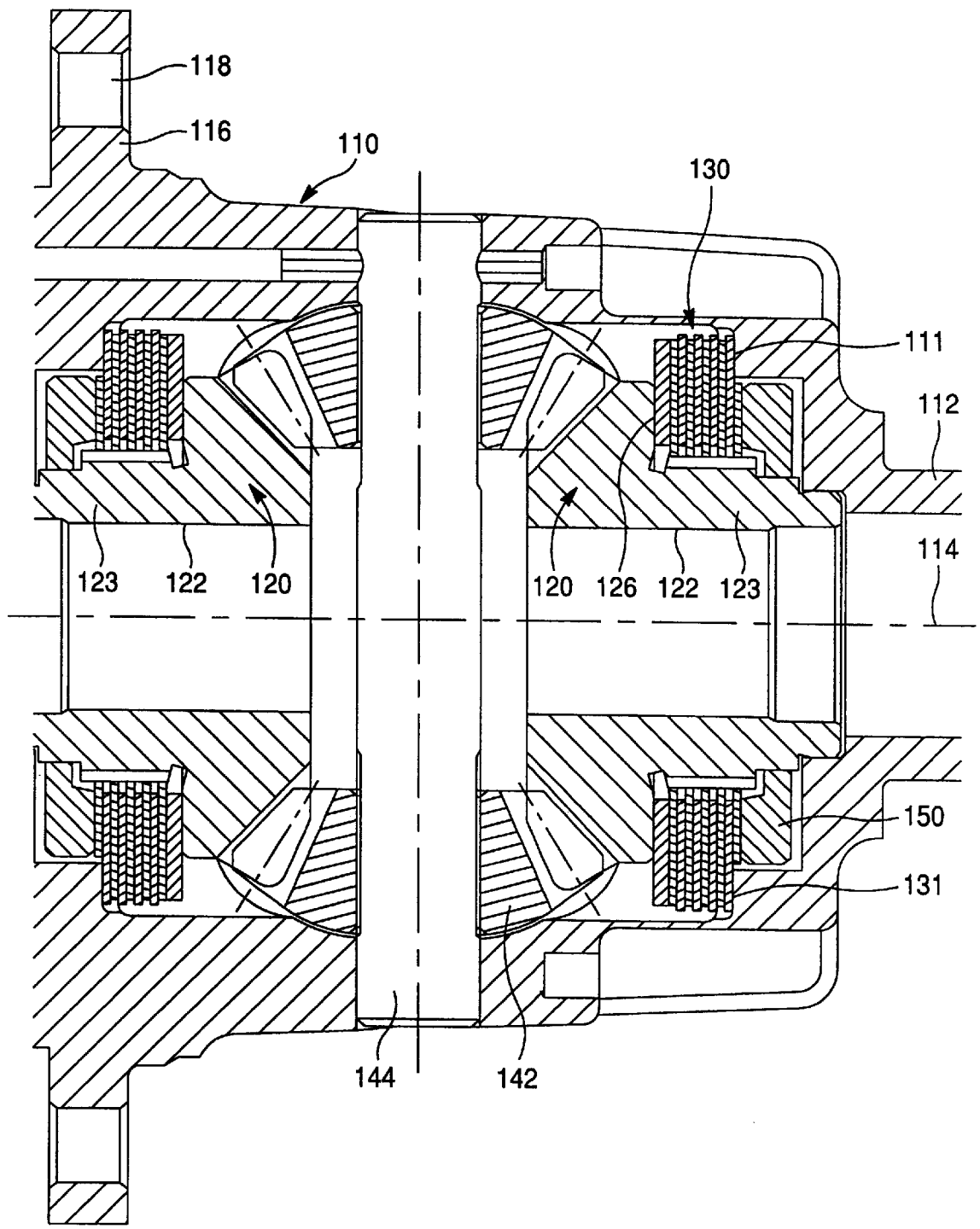
FIG. 4 is a cross-sectional view of a limited slip differential in accordance with the second preferred embodiment of the present invention.

FIG. 4 illustrates the second preferred embodiment of the present invention. It would be appreciated that the components of a limited slip differential in accordance with the second preferred embodiment have substantially similar structure and function as the components of the limited slip differential in accordance with the first preferred embodiment. However, in contrast with the previous embodiment, an annular radially extending thrust face 111 formed in a hollow compartment inside a differential case 110 frictionally engages an axially outer side surface of a clutch pack 130 having a plurality of clutch plates 131.

Thus, the limited slip differential in accordance with the second preferred embodiment of the present invention provides the accurately pre-loaded self-contained side gear/clutch pack assembly. However, it does not exclude the gear separating forces that would increase the torque-to-rotation above the initial Belleville spring pre-load that could be beneficial in a high performance application.

Therefore, in the novel arrangement of the limited slip differential of the present invention as constructed in the above-described embodiments, the side gear/clutch pack assembly may be pre-assembled as a pre-loaded self-contained module before the various components of the differential assembly are assembled in the differential case. Thus, the production and labor costs are considerably reduced because the management of parts and the assembly operation are significantly simplified.

The foregoing description of the preferred embodiments of the present invention has been presented for the purpose of illustration. in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also Intended that the scope of the present invention be defined by the claims appended thereto.

What is claimed is:

1. A limited slip differential comprising:

a differential case supported for rotation about an axis;

a pair of bevel side gears in said case provided at opposite ends thereof, said side gears being arranged for torque transmitting engagement with respective output shafts and being rotatable within said case about said axis, each of said side gears having a generally cylindrical hub surface coaxial with said axis and an engaging face extending radially outwardly from said hub surface;

a clutch pack associated with at least one of said side gears for frictionally connecting said side gear to said case, said clutch pack disposed adjacent to said engaging face, said clutch pack comprising at least one first member splined to rotate with the associated side gear and at least one second member keyed to rotate with said case and, said members being frictionally engageable with one another;

an annular lock ring fixedly secured on said hub surface adjacent to said clutch pack for retaining thereof in a predetermined pre-loaded condition, and at least two bevel planet gears each meshing with both side gears and supported in said case for rotation about a planet gear axis perpendicular to said axis.

2. The limited slip differential as defined in claim 1, wherein said clutch pack further comprising a biasing means resiliently pressing said first and second members into frictional engagement.

3. The limited slip differential as defined in claim 2, wherein said biasing means including at least one Belleville spring.

4. The limited slip differential as defined in claim 1, further comprising:

an axially outer annular side gear thrust face extending radially inwardly from said hub surface, and an axially inner radially extending differential case thrust face corresponding to said side gear thrust face.

5. The limited slip differential as defined in claim 4, further comprising a thrust washer interposed between said side gear thrust face and said differential case thrust face.

6. The limited slip differential as defined in claim 1, wherein said lock ring being secured on said hub surface by interference fit.

7. The limited slip differential as defined in claim 1, further comprising an axially inner radially extending differential case thrust face frictionally engaging said clutch pack.

8. A limited slip differential comprising:

a differential case supported for rotation about an axis, said case having an axially inner radially extending differential case thrust face;

a pair of bevel side gears in said case provided at opposite ends thereof, said side gears being arranged for torque transmitting engagement with respective output shafts and being rotatable within said case about said axis, each of said side gears having a generally cylindrical hub surface coaxial with said axis, an engaging face extending radially outwardly from said hub surface and an axially outer annular side gear thrust face extending radially inwardly from said hub surface, said side gear thrust face corresponding to said differential case thrust face;

a thrust washer interposed between said side gear thrust face and said differential case thrust face;

a clutch pack associated with at least one of said side gears for frictionally connecting said side gear to said case, said clutch pack disposed adjacent to said engaging face, said clutch pack comprising at least one first member splined to rotate with the associated side gear, at least one second member keyed to rotate with said case and at least one Belleville spring resiliently pressing said first and second members into frictional engagement;

an annular lock ring fixedly secured on said hub surface adjacent to said clutch pack for retaining thereof in a predetermined pre-loaded condition, and at least two bevel planet gears each meshing with both side gears and supported in said case for rotation about a planet gear axis perpendicular to said axis.

9. A limited slip differential comprising:

a differential case supported for rotation about an axis, said case having an axially inner radially extending differential case thrust face;

a pair of bevel side gears in said case provided at opposite ends thereof, said side gears being arranged for torque transmitting engagement with respective output shafts and being rotatable within said case about said axis, each of said side gears having a generally cylindrical hub surface coaxial with said axis and an engaging face extending radially outwardly from said hub surface;

a clutch pack associated with at least one of said side gears for frictionally connecting said side gear to said case, said clutch pack disposed adjacent to said engaging face at one side and frictionally engaging said differential case thrust face at the other side, said clutch pack comprising at least one first member splined to rotate with the associated side gear, at least one second member keyed to rotate with said case and at least one Belleville spring resiliently pressing said first and second members into frictional engagement;

an annular lock ring fixedly secured on said hub surface adjacent to said clutch pack for retaining thereof in a predetermined pre-loaded condition, and at least two bevel planet gears each meshing with both side gears and supported in said case for rotation about a planet gear axis perpendicular to said axis.

* * * * *